United States Patent
Saito

(10) Patent No.: US 7,116,495 B2
(45) Date of Patent: Oct. 3, 2006

(54) OPTICAL SYSTEM FOR OPTICAL PICKUP DEVICE, COUPLING LENS AND OPTICAL INFORMATION RECORDING/REPRODUCING APPARATUS

(75) Inventor: Shinichiro Saito, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 11/144,231

(22) Filed: Jun. 2, 2005

(65) Prior Publication Data

US 2005/0226121 A1 Oct. 13, 2005

Related U.S. Application Data

(63) Continuation of application No. 10/261,779, filed on Oct. 2, 2002, now abandoned.

(30) Foreign Application Priority Data

Oct. 5, 2001 (JP) .............................. 2001-310240

(51) Int. Cl.
*G02B 13/18* (2006.01)
(52) U.S. Cl. ................. 359/719; 359/718; 369/112.01; 369/44.23
(58) Field of Classification Search ................ 359/719, 359/718, 720, 737; 369/112.01, 44.23, 44.12, 369/112.2
See application file for complete search history.

(56) References Cited

U.S. PATENT DOCUMENTS

| 5,058,091 A | * | 10/1991 | Murao et al. | ............ 369/44.21 |
| 5,105,407 A | * | 4/1992 | Ishika | ..................... 369/44.37 |
| 5,914,822 A | * | 6/1999 | Maruyama et al. | ......... 359/743 |

* cited by examiner

*Primary Examiner*—Timothy Thompson
(74) *Attorney, Agent, or Firm*—Finnegan, Henderson, Farabow, Garrett & Dunner, L.L.P.

(57) ABSTRACT

An optical system includes an objective lens; and a plastic coupling lens to change a divergent angle of a light flux emitted from a light source and is structured such that the light flux emitted from the light source passes through both of the coupling lens and the objective lens when the light flux is converged onto an optical information recording medium and the reflected light flux reflected from the optical information recording medium passes through the objective lens without passing through the coupling lens when the reflected light flux is detected by a photo-detector. A ring-shaped diffractive structure is formed on at least one surface of the coupling lens and the diffractive structure generates an under-spherical aberration when a light flux having a longer wavelength comes in, and the coupling lens has a positive refractive power as a whole.

25 Claims, 3 Drawing Sheets

OPTICAL SYSTEM FOR OPTICAL PICKUP DEVICE, COUPLING LENS AND OPTICAL INFORMATION RECORDING/REPRODUCING APPARATUS

This application is a continuation application of U.S. application Ser. No. 10/261,779, filed Oct. 2, 2002, now abandoned the contents of which are incorporated herein by reference. That application claims the foreign priority benefit of Japanese Application No. 2001-310240, filed Oct. 5, 2001.

BACKGROUND OF THE INVENTION

The present invention relates to an optical system for an optical pickup device, a coupling lens used for the aforementioned optical system and an optical information recording/reproducing apparatus which has therein the optical system and conducts at least one of recording and reproducing of optical information.

In the diffusion of optical discs such as CD and DVD, an optical information recording medium capable of recording optical information has become the center of public attention. In the optical information recording medium capable of recording these optical information, for example, in the optical information recording medium utilizing phase changes, energy of the spot of image formation is important. In this case, even when light sources each having the same angle of divergence are used and even when NA of the objective lens closer to the medium is the same, it is clear that establishment of a coupling lens having the positive refractive power on the light source side of the objective lens shown in FIG. 3 is more advantageous on the point of the light source energy efficiency, compared with an occasion where no coupling lens is provided. In this case, when the optical system magnification for the forward direction is different from that for the return direction as shown in FIG. 3, the following points are feared.

Namely, an object point (light source light-emitting position) and an image point (optical information recording medium image formation position) both in the forward optical system are fixed, and an object point (optical information recording medium position) and a sensor position of a photo-detector both in the return optical system are fixed. If a decline of a refractive index in the course of temperature rise is caused, it is necessary to drive the objective lens in the direction for the objective lens to part from the optical information recording medium, when excessive spherical aberration is caused on the forward optical system and when trying to form a spot satisfactorily on the optical information recording medium. In this case, however, following troubles are caused.

If the objective lens is driven by an actuator in a way to obtain the best image point on the forward optical system, an excellent image formation spot is formed on at least one optical information recording medium. However, an image formation magnification is changed on the forward optical system because the objective lens is driven. In this case, with respect to the mechanical light-emitting point and the image formation point of the return optical system, the distance between them is constant in the same way as in the distance between a disc and a sensor. Therefore, the distance between the optical image formation point and a mechanical image formation point becomes great, causing harmful influences.

One of the harmful influences is that recording or reproducing is conducted as an optical pickup device under the condition which is not optically excellent image formation, because the mechanical image formation point is given priority. Another harmful influence is an occurrence of a trouble that a numerical aperture of the objective lens on the light emergence side is also changed when the image formation magnification on the forward optical system is changed, and a desired spot diameter cannot be obtained on the surface of an optical information recording medium.

SUMMARY OF THE INVENTION

In view of the problems in the conventional technologies, an object of the present invention is to provide an optical system for an optical pickup device wherein a plastic coupling lens is provided only on the optical path of the forward optical system, and thereby, an amount of deviation between the original image point on the return optical system and a position of the photo-detector is satisfied even in the case of temperature changes, and thus, an influence of temperature changes is eliminated, a coupling lens used for the aforementioned optical system, and an optical information recording/reproducing apparatus which has therein the optical system.

To attain the aforementioned object, a plastic coupling lens having a function to cancel changes of refracting power caused by changes of the refractive index of plastic in temperature changes is used in the invention.

Namely, an optical system used in an optical pickup device having therein a light source with wavelength λ, an optical system for forming images on an optical information recording medium from a light flux emitted from the light source, a focusing mechanism used in image formation on the optical information recording medium and a photo-detector that detects reflected light coming from the optical information recording medium, in the invention, is characterized in that the optical system is composed of an objective lens and a plastic coupling lens that changes an angle of divergence of a light flux emitted from the light source, the optical system is of the structure wherein the light flux from the light source passes the objective lens and the coupling lens when forming images on the optical information recording medium, and the reflected light from the optical information recording medium does not pass through the coupling lens and passes through the objective lens when the reflected light is detected by the photo-detector, a ring-shaped zonal diffractive structure is formed on at least one surface of the coupling lens, the diffractive structure generates under-spherical aberration when light with a long wavelength enters, and the coupling lens has a positive refracting power as a whole.

On the under-spherical aberration, an image is formed at a position where is located at an object lens side before a focal plane. In other word, a light flux having passed through the objective lens intersects the optical axis at the position.

In the optical system used in an optical pickup device, the plastic coupling lens is arranged so that light from the light source may pass through the aforementioned optical system on the forward optical system and the reflected light may not pass through the aforementioned optical system on the return optical system, and under spherical aberration is generated by the diffractive structure provided on the coupling lens, when light is shifted to the long wavelength side. Therefore, it is possible to correct chromatic aberration caused by temperature changes on the forward optical system, and it is possible to make an amount of movement of the objective lens relative to the optical information recording medium to be less. Owing to this, an image formation magnification on the forward optical system hardly changes, and a numerical aperture of the objective lens on the light emergence side does not change, which makes it possible to obtain a desired excellent spot diameter on the optical information recording medium. Further, an amount of deviation between an original image point and a position of a photo-detector on the return optical system can be controlled in temperature changes. Owing to this, the distance between the mechanical image formation point and the optical image formation point in the photo-detector does not become great, which makes it possible to conduct recording or reproducing under the excellent state of image formation.

Further, it is preferable that an image formation magnification of the individual coupling lens is mostly constant even in the case of temperature changes of the optical pickup device. It is possible to make an angle of divergence of a light flux emitted from the light source to be almost constant, by making the image formation magnification to be almost constant.

In addition, it is preferable that the following expression (1) is satisfied by amount of driving $\delta L$ (shifting distance) for the objective lens to be moved by the focusing mechanism so that the optimum image forming position may agree with the surface of the optical information recording medium when temperature of the optical pickup device is raised by 30° C., when a focal length of the objective lens is represented by f.

$$0.0001 < |\delta L/f| < 0.002 \quad (1)$$

When the expression (1) is satisfied, the image formation magnification on the forward optical system hardly changes.

Further, with respect to a ring-shaped zonal diffractive structure formed on the coupling lens, it is preferable that the following expression (2) is satisfied by minimum value pmin of a diffraction pitch in an effective diameter when n represents the order of the utilized diffraction.

$$10\lambda < pmin/n < 60\lambda \quad (2)$$

When the expression (2) shows the lower limit or higher, the diffraction pitch does not become too small, and an appropriated amount of light can be obtained, while, when the expression shows the upper limit or higher, a magnification change in temperature changes becomes great because the diffracting power is reduced.

It is preferable that each of the following expressions (3)–(6) is satisfied in the aforesaid optical system, when NA represents a numerical aperture of the objective lens on the optical information recording medium side, m represents an image formation magnification and f represents a focal length of the objective lens.

$$2.0 < f < 5.0 \quad (3)$$

$$0.45 \leq NA \leq 0.65 \quad (4)$$

$$-1/3 < m \leq 0 \quad (5)$$

$$600 \text{ nm} < \lambda < 800 \text{ nm} \quad (6)$$

In the aforesaid expressions, the image formation magnification m is defined by the following formula:

$$m = L_{image}/L_{obj}$$

where $L_{image}$ is a size or length of an formed image, and $L_{obj}$ is a size or length of an object.

In the optical system having a positive refractive power such as an objective lens of the present invention, when m=0, a parallel light flux comes to be incident into the objective lens, and when m<0, a divergent light flux comes to be incident into the objective lens and an inverted image is formed.

With respect to the coupling lens, it is preferable that the above-mentioned ring-shaped zonal diffractive structure is provided on the surface on one side of the coupling lens, and a grid-like diffractive structure that splits a light flux emitted from the light source into a plurality of light fluxes is provided on the surface on the other side thereof. This makes it easy to control a movement of the objective lens in the tracking direction for an optical information recording medium. In this case, it is preferable that the surface of the coupling lens where the grid-like diffractive structure is formed is mostly a plane surface.

It is further preferable that the objective lens is made of plastic. Thus, the objective lens is made to be light in weight, driving by the focusing mechanism is easy, and it is possible to contribute to downsizing of a focusing mechanism.

A coupling lens of the invention is a plastic coupling lens that constitutes, together with an objective lens, the optical system of the optical pickup device having therein light source with wavelength $\lambda$, an optical system for forming images on an optical information recording medium from a light flux emitted from the light source, a focusing mechanism used in image formation on the optical information recording medium and a photo-detector that detects reflected light coming from the optical information recording medium, and it is characterized in that the coupling lens has a positive refracting power that changes an angle of divergence of a light flux emitted from the light source, and it is outside an optical path when the photo-detector detects reflected light coming from the optical information recording medium, a ring-shaped zonal diffractive structure is formed on at least one surface of the coupling lens, and the diffractive structure stated above generates under spherical aberration when light with a long wavelength enters.

In this coupling lens, when light is shifted to the long wavelength side in the optical system for the aforesaid optical pickup device, under spherical aberration is generated by the diffractive structure provided on the coupling lens, and therefore, it is possible to correct chromatic aberration caused by temperature changes on the forward optical system, and it is possible to make an amount of movement of the objective lens relative to the optical information recording medium to be less. Owing to this, an image formation magnification on the forward optical system hardly changes, and a numerical aperture of the objective lens on the light emergence side does not change, which makes it possible to obtain a desired excellent spot diameter on the optical information recording medium. Further, an amount of deviation between an original image point and a position of a photo-detector on the return optical system can be controlled in temperature changes. Owing to this, the distance between the mechanical image formation point and the optical image formation point in the photo-detector does not become great, which makes it possible to conduct recording or reproducing under the excellent state of image formation.

Further, in the coupling lens stated above, it is preferable that an image formation magnification of the individual coupling lens is almost constant even in the case of temperature changes of the optical pickup device. It is further preferable to satisfy the expressions (2), (3), (4) and (5) stated above. It is preferable that the above-mentioned ring-shaped zonal diffractive structure is provided on the surface on one side of the coupling lens, and a grid-like diffractive structure that splits a light flux emitted from the light source into a plurality of light fluxes is provided on the surface on the other side thereof. In this case, it is preferable that the surface of the coupling lens where the grid-like diffractive structure is formed is mostly a plane surface.

Further, an optical information recording/reproducing apparatus of the invention having therein a light source with wavelength λ, an optical system for forming images on an optical information recording medium from a light flux emitted from the light source, a focusing mechanism used in image formation on the optical information recording medium and a photo-detector that detects reflected light coming from the optical information recording medium, is characterized in that the optical system is composed of an objective lens and a plastic coupling lens having a positive refracting power that changes an angle of divergence of a light flux emitted from the light source, and it is of the structure where the light flux emitted from the light source passes through the objective lens and the coupling lens when forming images on the optical information recording medium, and it passes through the objective lens when detecting the reflected light from the optical information recording medium, and a ring-shaped zonal diffractive structure is formed on at least one surface of the coupling lens, while, the diffractive structure generates under spherical aberration when light with a long wavelength enters.

In the optical information recording/reproducing apparatus, the plastic coupling lens is arranged so that light from the light source may pass through the aforementioned optical system on the forward optical system and the reflected light may not pass through the aforementioned optical system on the return optical system, and under spherical aberration is generated by the diffractive structure provided on the coupling lens, when light is shifted to the long wavelength side. Therefore, it is possible to correct chromatic aberration caused by temperature changes on the forward optical system, and it is possible to make an amount of movement of the objective lens relative to the optical information recording medium to be less. Owing to this, an image formation magnification on the forward optical system hardly changes, and a numerical aperture of the objective lens on the light emergence side does not change, which makes it possible to obtain a desired excellent spot diameter on the optical information recording medium. Further, an amount of deviation between an original image point and a position of a photo-detector on the return optical system can be controlled in temperature changes. Owing to this, the distance between the mechanical image formation point and the optical image formation point in the photo-detector does not become great, which makes it possible to conduct recording or reproducing under the excellent state of image formation.

Further, in the optical information recording/reproducing apparatus, it is preferable that an image formation magnification of the individual coupling lens is almost constant even in the case of temperature changes of the apparatus. It is further preferable to satisfy the expressions (1), (2), (3), (4) and (5) stated above. It is preferable that the above-mentioned ring-shaped zonal diffractive structure is provided on the surface on one side of the coupling lens, and a grid-like diffractive structure that splits a light flux emitted from the light source into a plurality of light fluxes is provided on the surface on the other side thereof, and in this case, it is preferable that the surface of the coupling lens where the grid-like diffractive structure is formed is mostly a plane surface. It is further preferable that the objective lens is made of plastic.

Incidentally, the optical information recording medium in the invention includes, for example, various types of CD such as CD, CD-R, CD-RW, CD-Video and CD-ROM, various types of DVD such as DVD, DVD-ROM, DVD-RAM, DVD-R, DVD-RW and DVD+RW, or MD.

Recording of information and reproducing of information in the invention respectively mean that information is recorded on the information recording surface of the optical information recording medium and that information recorded on the information recording surface is reproduced. The optical system of the invention may be either one used only for recording or for reproducing, or one used for both recording and reproducing. Further, the optical system of the invention may be either one that is used to conduct recording for a certain optical information recording medium and to conduct reproducing for the other optical information recording medium, or one used to conduct recording or reproducing for a certain optical information recording medium and to conduct recording and reproducing for the other optical information recording medium. Incidentally, reproducing in this case is one including only reading of information.

DETAILED DESCRIPTION OF THE PREFERRED EMBODIMENT

Figure 1:
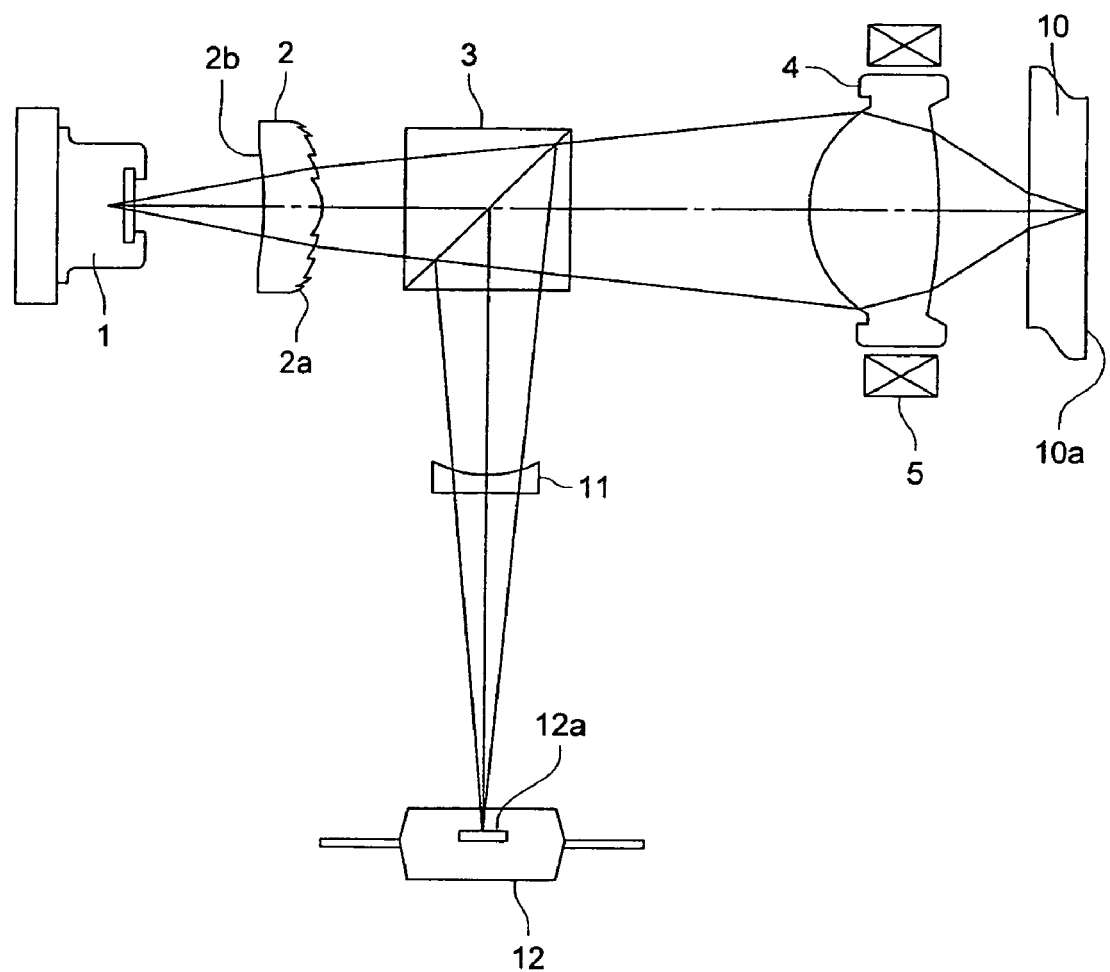
FIG. 1 is a diagram showing schematically an optical system of the optical pickup device in the embodiment of the invention.

An embodiment of the invention will be explained as follows, referring to the drawings. FIG. 1 is a diagram showing schematically an optical system of the optical pickup device in the embodiment of the invention, and FIG. 2 is a perspective view showing a coupling lens of the optical pickup device shown in FIG. 1.

The optical pickup device in FIG. 1 has therein light source 1 that is composed of a laser semiconductor laser and has wavelength λ, plastic coupling lens 2 that changes an angle of divergence of a light flux emitted from the light source 1 and has a positive refracting power, deflecting element 3 through which the rays of light emerging from the coupling lens 2 pass, objective lens 4 that makes the rays of light from the deflecting element 3 to form an image on information recording surface 10a through a protective layer of optical information recording medium 10, biaxial actuator 5 that drives to move the objective lens 4 both in the focusing direction and the tracking direction, and photo-detector 12 into which the reflected light from the information recording surface 10a of the optical information recording medium 10 comes through astigmatism generating lens 11 after passing the objective lens 4 and being reflected by the deflecting element 3, to be photo-detected.

Figure 2:
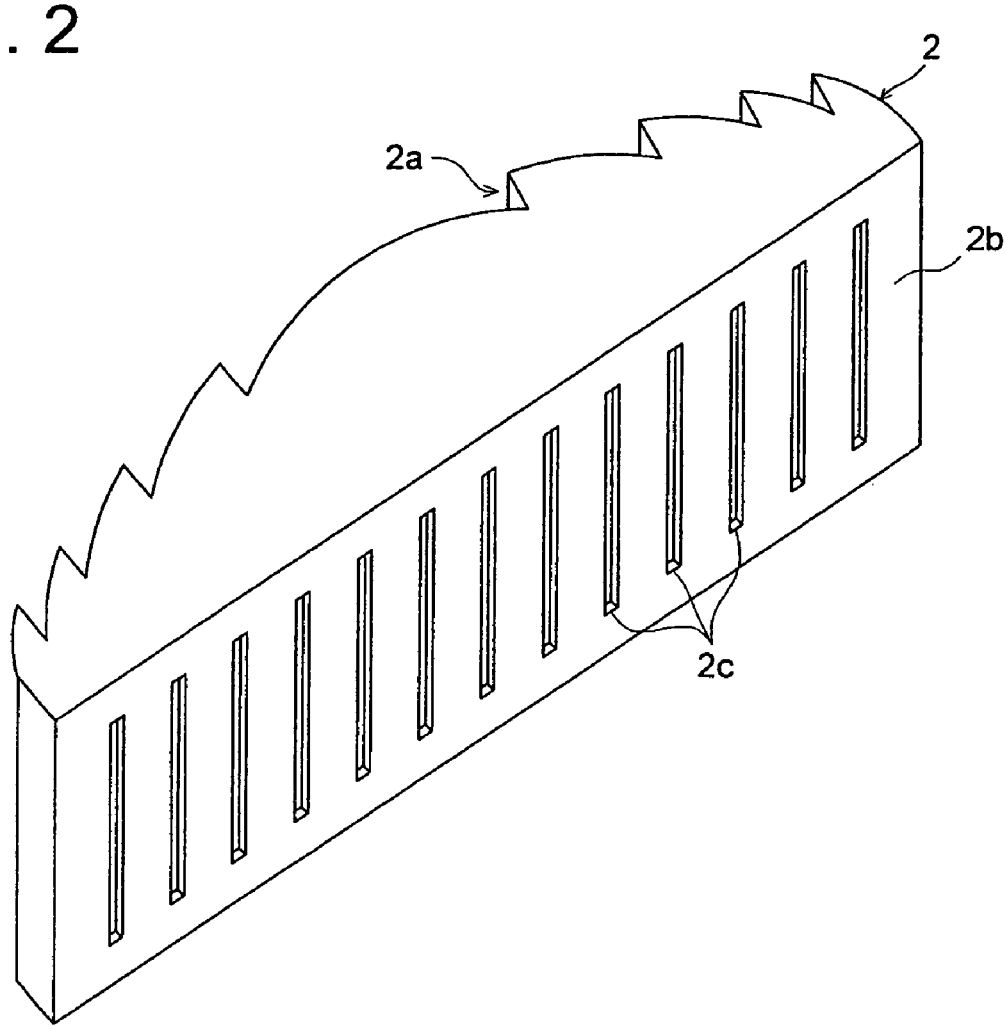
FIG. 2 is a perspective view showing a coupling lens of the optical pickup device shown in FIG. 1.
Figure 3:
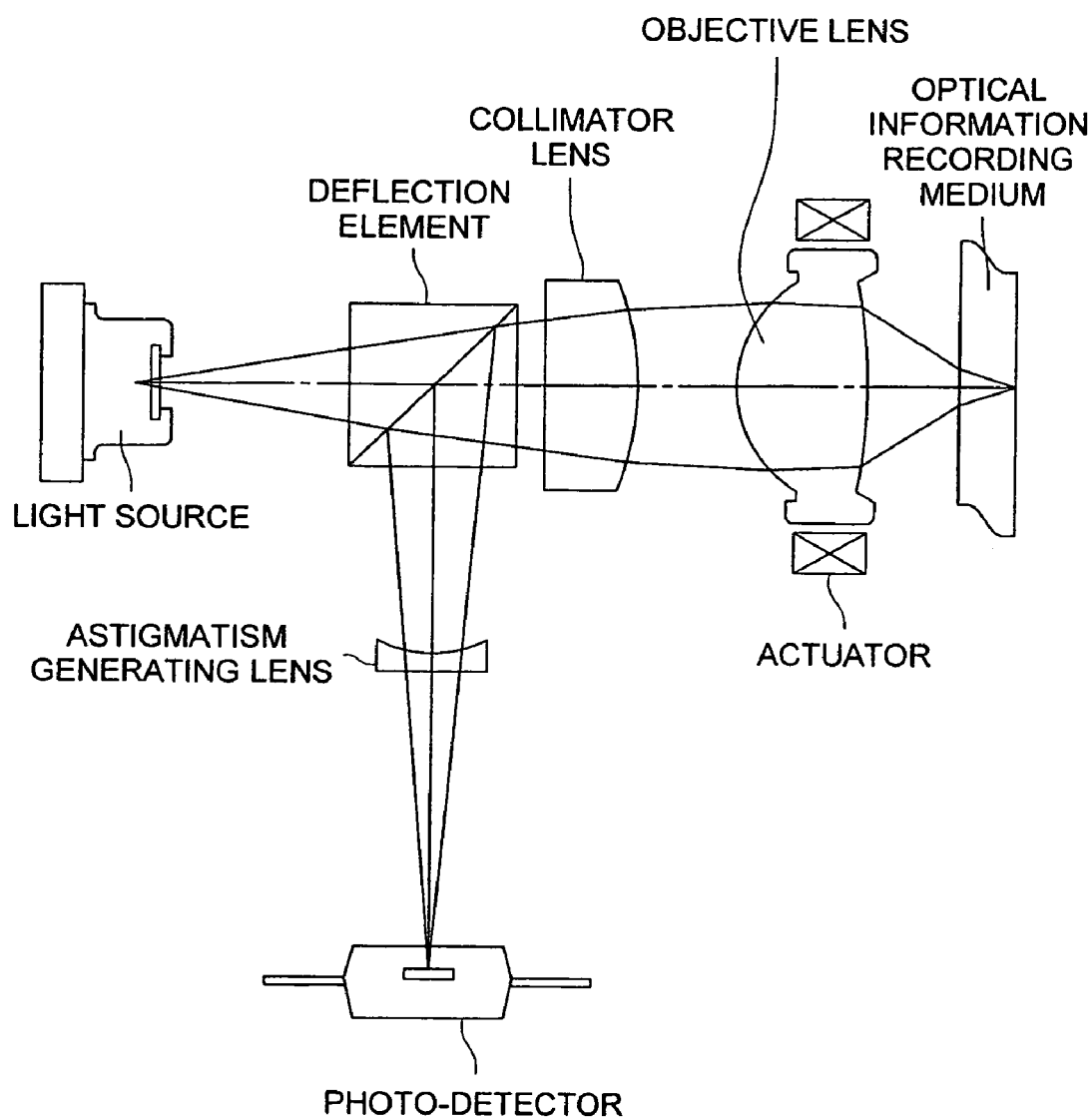
FIG. 3 is a diagram showing schematically a conventional optical system of the optical pickup device to which a coupling lens is added.

As shown in FIG. 1 and FIG. 2, the coupling lens 2 has therein refracting interface 2a on which a ring-shaped zonal diffractive structure is formed on the surface of the coupling lens closer to the objective lens 4 and practical plane surface 2b on which grid-like diffractive structure 2c is formed on the surface of the coupling lens that is opposite to the refracting interface 2a and is closer to the light source. The refracting interface 2a of the coupling lens is a diffractive surface on which a ring-shaped zonal diffractive structure is formed, and it is possible to correct chromatic aberration caused by temperature changes, by generating spherical aberration in the under direction when a wavelength of light entering the above-mentioned refracting interface is shifted to the long wavelength side. When trying to correct the chromatic aberration completely, the diffracting power of the diffractive surface provided on the coupling lens becomes strong, but in this case, there are caused harmful influences such as a decline of diffraction efficiency caused by a miniaturized pitch of diffractive ring-shaped zones and a weakness for chromatic aberration that is followed by no temperature changes. Therefore, the pitch of ring-shaped zones needs to be determined by considering the balance of the foregoing.

In the optical pickup device shown in FIG. 1, the forward optical system is composed of the coupling lens 2, the deflecting element 3 and the objective lens 4, and light emitted from the light source 1 is made by the forward optical system to form an image on the information recording surface 10a of the optical information recording medium 10. While, the return optical system is composed of the objective lens 4, the deflecting element 3 and the astigmatism generating lens 11, and the reflected light from the information recording surface 10a enters detection surface 12a of the photo-detector 12.

As stated above, the coupling lens 2 is arranged so that light emitted from the light source 1 may pass through it, and the reflected light from the information recording surface 10a may not pass through it on the return optical system, and under spherical aberration is generated by the refracting interface 2a of the coupling lens 2 when light from the light source 1 is shifted to the long wavelength side. It is therefore possible to correct chromatic aberration caused by temperature changes on the forward optical system and to lessen an amount of movement of the objective lens 4 for optical information recording medium 10 by actuator 5 in the course of focusing. Therefore, the image formation magnification on the forward optical system hardly changes and a numerical aperture of the objective lens on the emergence side does not change, and a desired excellent spot diameter can be obtained on the optical information recording medium surface 10. It is also possible to control an amount of deviation between an original image point on the return optical system and a position of a photo-detector on the return optical system and detection surface 12a of the photo-detector 12. Owing to this, the distance between the mechanical image formation point and the optical image formation point in the photo-detector does not become great, which makes it possible to conduct recording or reproducing under the excellent state of image formation.

Incidentally, it is possible to constitute an optical information recording/reproducing apparatus so that it may include the aforementioned optical pickup device and at least one of recording and reproducing of information may be conducted with respect to an optical information recording medium.

EXAMPLE

Next, an example of the optical system of the optical pickup device shown in FIG. 1 will be explained. An aspheric surface formed on each of the coupling lens and the objective lens is expressed by the following expression Numeral 1, when an X-axis is in the optical axis direction, a height in the direction perpendicular to the optical axis is represented by h, and a radius of curvature of the refracting interface is represented by r, wherein, κ represents a constant of the cone and Ai represents a coefficient of the aspheric surface.

$$X = \frac{h^2/r}{1 + \sqrt{1 - (1+\kappa)h^2/r^2}} + \sum_{i=1} A_i h^{P_i}$$

Further, the diffractive surface on the coupling lens is expressed by the following expression Numeral 2 with optical path difference function $\Phi b$, wherein h represents a height perpendicular to the optical axis and b2i represents a coefficient of optical path difference function.

$$\Phi_b = \sum_{i=1} b_{2i} h^{2i} \qquad \text{Numeral 2}$$

Optical data of the present Example 1 are shown in Table 1. Incidentally, in the Example 1, a grid-like diffractive structure in the practical plane surface 2b in FIG. 2 of the coupling lens is omitted.

Table 1

Example 1

λ=785 nm, NA=0.53, m=−0.237, f=3.33 mm
δL=0.027 mm, Pmin=0.034 mm

Temperature dependence of refractive index for plastic representing a material of coupling lens:
δn/δT=−0.00012 (/° C.)

Temperature dependence of refractive index for plastic representing a material of objective lens:
δn/δT=−0.00012 (/° C.)

Temperature dependence of oscillation wavelength of light source wavelength: δλ/δT=−0.2 (nm/° C.)

| Surface number | Radius of curvature | Spacing between surfaces | Refractive index | |
|---|---|---|---|---|
| 0 | | 5.419 | 1.0 | Light source |
| 1 | −12.2711 | 1.2 | 1.53 | Coupling lens |
| 2 | −7.33922 | 3.0 | 1.0 | |
| 3 | ∞ | 4.0 | 1.51108 | Deflecting index |
| 4 | ∞ | 10 | 1.0 | |
| 5 | 2.3360 | 2.8 | 1.53 | Objective lens |
| 6 | −4.2240 | 1.6466 | 1.0 | |
| 7 | ∞ | 1.2 | 1.57 | Optical information recording medium |
| 8 | ∞ | | | |

A unit for each of radius of curvature and spacing between surfaces is mm.

Diffraction, Aspheric Surface Data

Second surface
    Diffractive surface (Diffraction order n = 1)
        Coefficient of aspheric surface
        κ          −1.1680 × E − 1
        A1         −4.3746 × E − 5      P1         4.0

-continued

| Optical path difference function (Coefficient of optical path difference function: Standard wavelength 785 nm) | | | |
|---|---|---|---|
| B2 | −1.4488 × E − 2 | | |
| B4 | −7.0118 × E − 5 | | |
| Fifth surface aspheric surface Coefficient of aspheric surface | | | |
| κ | −0.12288 × E + 1 | | |
| A1 | +0.36576 × E − 2 | P1 | 4.0 |
| A2 | −0.13950 × E − 3 | P2 | 6.0 |
| A3 | −0.53090 × E − 5 | P3 | 8.0 |
| A4 | +0.60630 × E − 6 | P4 | 10.0 |
| Sixth surface aspheric surface Coefficient of aspheric surface | | | |
| κ | −0.76763 × E + 1 | | |
| A1 | +0.52736 × E − 3 | P1 | 4.0 |
| A2 | +0.20881 × E − 4 | P2 | 6.0 |
| A3 | −0.95600 × E − 5 | P3 | 8.0 |
| A4 | +0.85778 × E − 6 | P4 | 10.0 |

The following data are obtained from Table 1, and it is understood that all of them satisfy the expressions (1) and (2) above.

$$|\delta L/f|=0.0081$$

$$p\min/n=0.034 \text{ mm}$$

Further, the temperature dependence of the refractive index for plastic representing a material of the coupling lens is $\delta n/\delta T=-0.00012$ (/° C.), and temperature dependence of oscillation wavelength of light source wavelength is $\delta\lambda/\lambda T=-0.2$ (nm/° C.), while, a light source wavelength is shifted to the long wavelength side and a refractive index of the coupling lens is lowered in the case of temperature rise, but over spherical aberration is generated on the diffractive surface of the coupling lens. Due to this, amount of movement of the objective lens δL is within a range of expression (1), and an image formation magnification is changed less even when temperature changes.

Table 2 shows changes of image formation magnification in temperature rise of an individual coupling lens, in comparison with an occasion where no diffractive surface is provided, which indicates that the image formation magnification does not change on the coupling lens provided with a diffractive surface in the present example even in the case of temperature change of +30° C., while, the image formation magnification is raised on the coupling lens provided with no diffractive surface.

TABLE 2

| Image formation magnification for individual coupling lens | | |
|---|---|---|
| | In ordinary temperature | In the case of δT = +30° C. |
| Plastic coupling lens with diffraction | 1.7 | 1.7 |
| Plastic coupling lens without diffraction | 1.73 | 1.76 |

Incidentally, in the aforesaid table, there are sometimes shown in the way, for example, of E-2 (=10⁻²), by using E (or e) for the expression of the exponent of 10.

Though the invention has been explained as stated above, referring to the embodiment and the example, the invention can be modified variously within a scope of the technical spirit of the invention, without being limited to the aforementioned embodiment and example. For example, though the coupling lens in FIG. 1 is of the finite magnification, the coupling lens of the invention is not limited to this, and it may be one with infinite magnification which converts a divergent light flux into a parallel light flux. Namely, it may either be one with finite magnification such as that in FIG. 1 or be one with infinite magnification such as a collimator lens, provided that an angle of divergent light flux emitted from the light source can be changed.

An optical system for the optical pickup device, a coupling lends and an optical information recording/reproducing apparatus all of the invention make it possible to eliminate influences of temperature changes by arranging a plastic coupling lens on the forward optical system alone and thereby satisfying an amount of deviation between the original image point on the return optical system and a position of the photo-detector.

What is claimed is:

1. An optical system for use in an optical pickup apparatus which comprises a light source to emit a light flux having a wavelength λ, the optical system to converge the light flux onto an optical information recording medium, a focusing device to focus the converged light flux on the optical information recording medium, and a photo-detector to detect a light flux reflected from the optical information recording medium; the optical system comprising:

an objective lens;

a plastic coupling lens to change a divergent angle of the light flux emitted from the light source; and an optical element, provided between the objective lens and the plastic coupling lens, to pass light flux from the plastic coupling lens and to reflect light flux from the objective lens to the photo-detector;

wherein the optical system is structured such that the light flux emitted from the light source passes through the coupling lens, the optical element and the objective lens in this order when the light flux is converged onto the optical information recording medium and the reflected light flux reflected from the optical information recording medium passes through the objective lens and is reflected by the optical element to the photo-detector without passing through the coupling lens when the reflected light flux is detected by the photo-detector, wherein a ring-shaped diffractive structure is formed on at least one surface of the coupling lens, wherein the coupling lens has a positive refractive power as a whole, and wherein a change of an image forming magnification of the coupling lens as a single optical element is negligible even when temperature of the optical pickup apparatus is changed.

2. The optical system of claim 1, wherein the following conditional formula is satisfied:

$$0.0001<|\delta L/f|<0.002$$

where δL is a shifting distance in a direction along an optical axis to shift the objective lens by the focusing device in order to conform an optimum image forming position with a recording surface of the optical information recording medium when temperature of the optical pickup apparatus is raised by 30°C., and f is a focal length of the objective lens.

3. The optical system of claim 1, wherein the ring-shaped diffractive structure formed on the coupling lens satisfies the following formula:

$$10\lambda<p\min/n<60\lambda$$

where pmin represents a minimum value of a diffractive pitch within an effective diameter, and n is a utilized diffraction order.

4. The optical system of claim 1, wherein the following conditional formulas are satisfied:

$2.0 < f < 5.0$, $0.45 < NA \leq 0.65$, $-\frac{1}{3} < m \leq 0$, and $600 \text{ nm} < \lambda < 800 \text{ nm}$ where NA is a numerical aperture, m is an image forming magnification, and f is a focal length.

5. The optical system of claim 1, wherein on one surface of the coupling lens is formed the ring-shaped diffractive structure and on the other surface of the coupling lens is formed a lattice-shaped diffractive structure for splitting the light flux emitted from the light source into a plurality of light fluxes.

6. The optical system of claim 5, wherein the surface on which the lattice-shaped diffractive structure is formed is almost a flat surface.

7. The optical system of claim 1, wherein the objective lens is made of a plastic.

8. An optical pickup apparatus for recording and/or reproducing information on an optical information recording medium, comprising:

a light source for emitting a light flux having a wavelength $\lambda$, an optical system for converging the light flux onto an optical information recording medium, a focusing device for focusing the converged light flux on the optical information recording medium, and a photo-detector for detecting a light flux reflected from the optical information recording medium;

wherein the optical system comprises an objective lens, a plastic coupling lens having a positive refractive power as a whole to change a divergent angle of the light flux emitted from the light source and an optical element, provided between the objective lens and the plastic coupling lens, to pass light flux coming from the plastic coupling lens and to reflect light flux coming from the objective lens to the photo-detector;

wherein the optical system is structured such that the light flux emitted from the light source passes through the coupling lens, the optical element and the objective lens in this order when the light flux is converged onto the optical information recording medium and the reflected light flux reflected from the optical information recording medium passes through the objective lens and is reflected by the optical element to the photo-detector without passing through the coupling lens when the reflected light flux is detected by the photo-detector, wherein a ring-shaped diffractive structure is formed on at least one surface of the coupling lens, and wherein a change of an image forming magnification of the coupling lens as a single optical elements negligible even when the temperature of the optical pickup apparatus is changed.

9. An optical system for use in an optical pickup apparatus which comprises a light source to emit a light flux having a wavelength $\lambda$, the optical system to converge the light flux onto an optical information recording medium, a focusing device to focus the converged light flux on the optical information recording medium, and a photo-detector to detect a light flux reflected from the optical information recording medium; the optical system comprising:

an objective lens; and a plastic coupling lens for changing a divergent angle of the light flux emitted from the light source;

wherein the optical system is structured such that the light flux emitted from the light source passes through both of the coupling lens and the objective lens when the light flux is converged onto the optical information recording medium and the reflected light flux reflected from the optical information recording medium passes through the objective lens without passing through the coupling lens when the reflected light flux is detected by the photo-detector, wherein a ring-shaped diffractive structure is formed on at least one surface of the coupling lens, wherein the coupling lens has a positive refractive power as a whole, and wherein a change of an image forming magnification of the coupling lens as a single optical element is negligible even when temperature of the optical pickup apparatus is changed.

10. A coupling lens for use in an optical system comprising the coupling lens and an objective lens, wherein the optical system is used in an optical pickup apparatus which comprises a light source to emit a light flux having a wavelength $\lambda$, the optical system to converge the light flux onto an optical information recording medium, a focusing device to focus the converged light flux on the optical information recording medium, and a photo-detector to detect a light flux reflected from the optical information recording medium; the coupling lens comprising:

a ring-shaped diffractive structure formed on at least one surface of the coupling lens, wherein the coupling lens has a positive refractive power to change a divergent angle of a light flux emitted from the light source and is located outside of an optical path when a reflected light flux from the optical information recording medium is detected by the photo-detector, and wherein a change of an image forming magnification of the coupling lens as a single optical element is negligible even when temperature of the optical pickup apparatus is changed.

11. An optical information recording and/or reproducing apparatus, comprising:

a light source for emitting a light flux having a wavelength $\lambda$, an optical system for converging the light flux onto an optical information recording medium, a focusing device for focusing the converged light flux on the optical information recording medium, and a photo-detector for detecting a light flux reflected from the optical information recording medium;

wherein the optical system comprises an objective lens, and a plastic coupling lens having a positive refractive power as a whole to change a divergent angle of the light flux emitted from the light source;

wherein the optical system is structured such that the light flux emitted from the light source passes through both of the coupling lens and the objective lens when the light flux is converged onto the optical information recording medium and the reflected light flux reflected from the optical information recording medium passes through the objective lens without passing through the coupling lens when the reflected light flux is detected by the photo-detector, wherein a ring-shaped diffractive structure is formed on at least one surface of the coupling lens, and wherein a change of an image forming magnification of the coupling lens as a single optical element is negligible even when temperature of the optical pickup apparatus is changed.

12. The coupling lens of claim 10, wherein the ring-shaped diffractive structure formed on the coupling lens satisfies the following formula:

$$10 < pmin/n < 60$$

where pmin represents a minimum value of a diffractive pitch within an effective diameter, and n is a utilized diffraction order.

13. The coupling lens of claim 10, wherein the following conditional formulas are satisfied:

$$2.0 < f < 5.0,$$

$$0.45 \leq NA \leq 0.65,$$

$$-\tfrac{1}{3} < m \leq 0, \text{ and}$$

$$600 \text{ nm} < \lambda < 800 \text{ nm}$$

where NA is a numerical aperture, m is an image forming magnification, and f is a focal length.

14. The coupling lens of claim 10, wherein on one surface of the coupling lens is formed the ring-shaped diffractive structure and on the other surface of the coupling lens is formed a lattice-shaped diffractive structure to split the light flux emitted from the light source into a plurality of light fluxes.

15. The coupling lens of claim 14, wherein the surface on which the lattice-shaped diffractive structure is formed is almost a flat surface.

16. The optical information recording and/or reproducing apparatus of claim 11, wherein the following conditional formula is satisfied:

$$0.0001 < |\delta L/f| < 0.002$$

where δL is a shifting distance in a direction along an optical axis to shift the objective lens by the focusing device in order to conform an optimum image forming position with a recording surface of the optical information recording medium when the temperature of the optical pickup apparatus is raised by 30°C., and f is a focal length of the objective lens.

17. The optical information recording and/or reproducing apparatus of claim 11, wherein the ring-shaped diffractive structure formed on the coupling lens satisfies the following formula:

$$10\lambda < pmin/n < 60$$

where pmin represents a minimum value of a diffractive pitch within an effective diameter, and n is a utilized diffraction order.

18. The optical information recording and/or reproducing apparatus of claim 11, wherein the following conditional formulas are satisfied:

$$2.0 < f < 5.0,$$

$$0.45 \leq NA \leq 0.65,$$

$$-\tfrac{1}{3} < m \leq 0, \text{ and}$$

$$600 \text{ nm} < \lambda < 800 \text{ nm},$$

where NA is a numerical aperture, m is an image forming magnification, and f is a focal length.

19. The optical information recording and/or reproducing apparatus of claim 11, wherein on one surface of the coupling lens is formed the ring-shaped diffractive structure and on the other surface of the coupling lens is formed a lattice-shaped diffractive structure to split the light flux emitted from the light source into a plurality of light fluxes.

20. The optical information recording and/or reproducing apparatus of claim 19, wherein the surface on which the lattice-shaped diffractive structure is formed is almost a flat surface.

21. The optical information recording and/or reproducing apparatus of claim 11, wherein the objective lens is made of a plastic.

22. The optical system of claim 1, wherein a change of an image forming magnification of the coupling lens due to a change of a refractive power of the coupling lens is canceled by a diffractive power of the diffractive structure provided on the coupling lens.

23. The optical pickup apparatus of claim 8, wherein a change of an image forming magnification of the coupling lens due to a change of a refractive power of the coupling lens is canceled by a diffractive power of the diffractive structure provided on the coupling lens.

24. The coupling lens of claim 10, wherein a change of an image forming magnification of the coupling lens due to a change of a refractive power of the coupling lens is canceled by a diffractive power of the diffractive structure provided on the coupling lens.

25. The optical information recording and/or reproducing apparatus of claim 11, wherein a change of an image forming magnification of the coupling lens due to a change of a refractive power of the coupling lens is canceled by a diffractive power of the diffractive structure provided on the coupling lens.

* * * * *